Dec. 28, 1937.  A. R. LEFEVRE  2,103,590
RESILIENT SUSPENSION DEVICE FOR MOTOR CARS OR OTHER VEHICLES
Filed Aug. 15, 1934  3 Sheets-Sheet 1
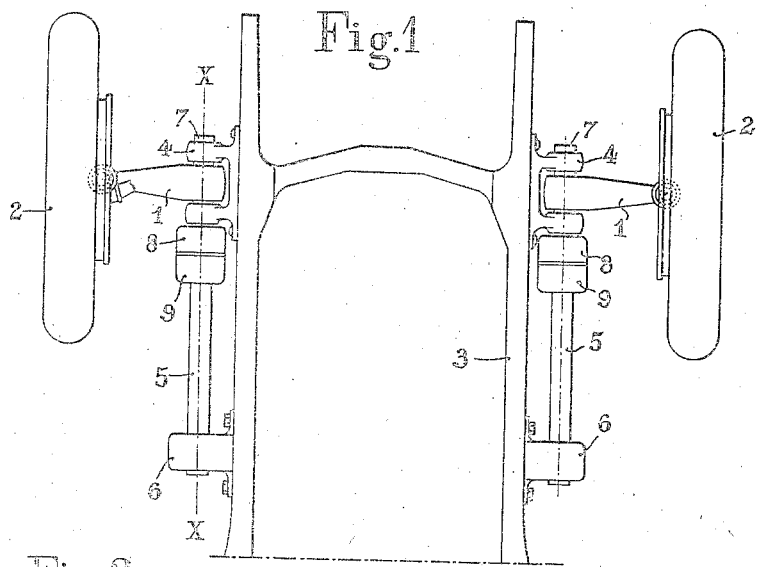
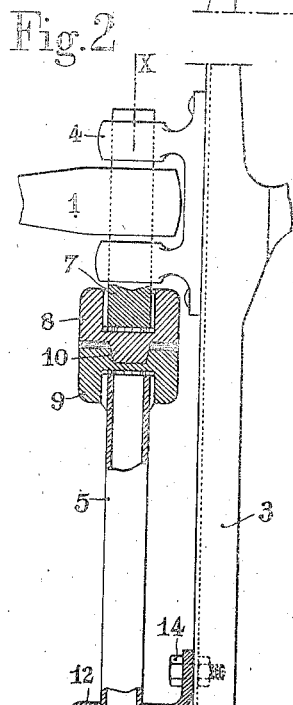
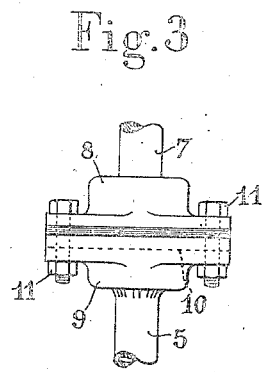
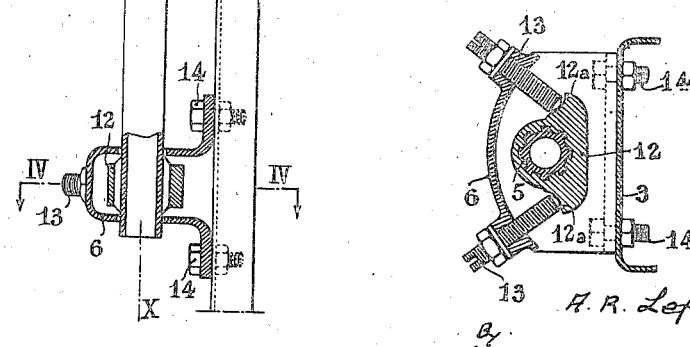
A. R. Lefevre
INVENTOR Dec. 28, 1937.  A. R. LEFEVRE  2,103,590
RESILIENT SUSPENSION DEVICE FOR MOTOR CARS OR OTHER VEHICLES
Filed Aug. 15, 1934  3 Sheets-Sheet 2

A. R. Lefevre
INVENTOR

By
Glascock Downing & Seebold
Attys.

Patented Dec. 28, 1937

2,103,590

UNITED STATES PATENT OFFICE 2,103,590

RESILIENT SUSPENSION DEVICE FOR MOTOR CARS OR OTHER VEHICLES

André René Lefevre, Paris, France, assignor to Société Anonyme Andre Citroen, Paris, France Application August 15, 1934, Serial No. 740,014
In France August 26, 1933

4 Claims. (Cl. 267—57)

Resilient suspension devices for motor cars or other vehicles are already known, in which each wheel is connected to the suspended part through the medium of an arm or lever; an end of this arm is connected to the wheel in a manner suited to the nature of the latter (either simply a carrying wheel, or a driving, or steering, or both a driving and steering wheel) and the other end is pivoted to the suspended part of the vehicle, the connection between the arm and this suspended part comprising, on the other hand, a rod or a tube adapted to resiliently work under a torsional stress under the weight of the suspended part, and to thus provide a resilient suspension. These devices are usually provided, for the assemblage of the resilient tube or rod, and at the ends of the latter, with fluted or like couplings or joints.

In existing devices, the operations for changing or replacing springs (the term "springs" designating herein the tube or rod the resiliency of which ensures the suspension) are most often long and difficult, as, for avoiding "snapping" and calking, the fluted, key or like joints are forcibly and very tightly driven in.

On the other hand, in these ordinary devices, the angular positioning of the arm or lever giving exactly the desired mean position under load is usually very difficult to obtain, unless use is made of the differential arrangements of the flutes at both ends of the resilient tube or rod, which arrangements complicate the machining and assemblage.

The present invention has for its object improvements in the arrangement of suspension devices of this type, in order to remedy the above inconveniences.

In the device according to the invention, the resilient tube or rod is used in such a manner that it is possible to appreciably lighten it, whilst preserving the same rate of work for the same. On the other hand, this device is so arranged that the assemblage, removal and adjustments of the resilient tube or rod are rendered remarkably simple, easy and rapid.

The device according to the invention will be described hereinafter, with reference to the accompanying drawings which illustrate, by way of example only, various forms of carrying the said invention into practice and in which:

Fig. 1 is a diagrammatic plan view showing the general arrangement of the suspension.

Figs. 2 to 4 illustrate a first form of construction:

Fig. 2 is a plan view thereof, with parts broken away.

Fig. 3 is a partial elevation thereof.

Fig. 4 is a section made according to line IV—IV of Fig. 2.

Figure 5:
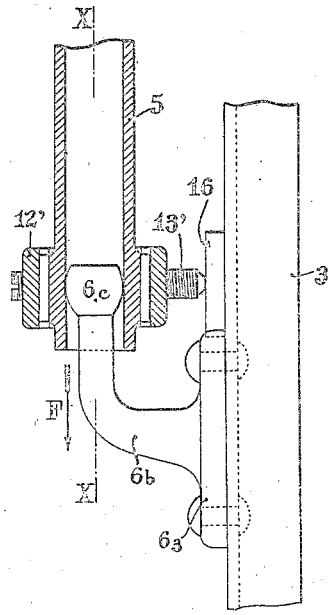
Figure 6:
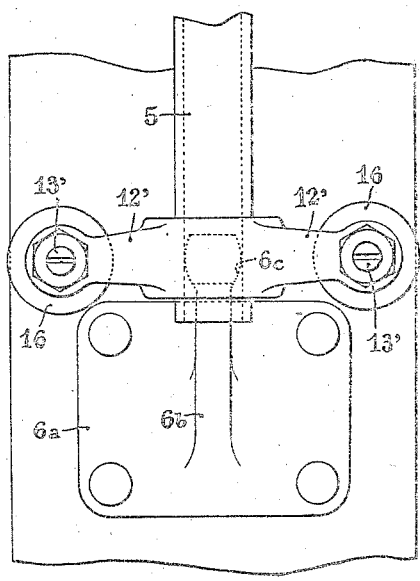

Figs. 5 and 6, illustrating another form of construction, are a partial plan view and a corresponding elevation, respectively, of the said form of construction.

Figure 7:
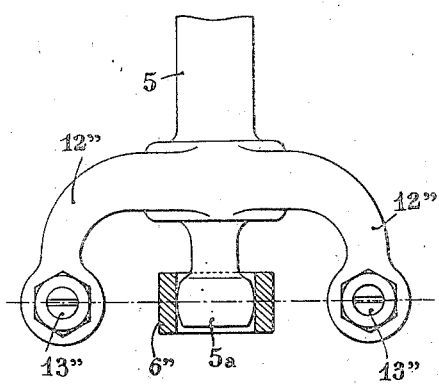

Fig. 7 is a view similar to Fig. 6, illustrating a modification.

Figs. 8 to 11 are plan views with parts broken away, showing respectively various other forms of construction.

The general arrangement of this device is diagrammatically illustrated in Fig. 1, in which 3 designates the suspended part of the vehicle (for instance the chassis), and 2 designates a wheel. The connection between these two elements is ensured by an arm 1, one end of which is connected to the wheel 2 (in the example under consideration, the wheel 2 being a steering wheel, this connection is a pivot joint suitably set). The other end of the arm 1 is connected to the suspended part 3 by a pivot pin fork-piece 4, the axis X—X of which is parallel to the median longitudinal plane of the vehicle. The connection between the arm 1 and the suspended part 3 comprises, on the other hand, a tube or rod 5 arranged according to the axis X—X, and one end of which is caused to rotate with the arm 1, whilst the other end is secured, at 6, to the suspended part 3, in such a manner that the suspended weight supported by the wheel 2 is absorbed by a resilient torsion, having X—X for axis, of the tube or rod 5.

According to the invention, this resilient device is rendered easily removable and adjustable owing to the following arrangements:

In the form of construction shown in Figs. 2 to 4, the pivot pin 7 connecting the arm 1 to the fork-piece 4 carries, externally to the arms of this fork-piece and on the side facing the tube 5, an end piece 8, secured on the said pivot pin 7, and carrying at its end a head 10 having, for instance, the shape of a screw driver, or, more generally, at right angles to the axis X—X, a non-circular cross section.

On the corresponding end of the tube 5 is secured, for instance by a fluted joint, an end piece 9 provided, on its face opposite the end piece 8, with a housing or recess the shape of which corresponds to that of the head 10, and into which this head is driven, in such a manner that the tube 5 and the pivot pin 7 are rendered rigid for a rotation according to the axis X—X. The assemblage and separation of the pivot pin 7 and of the tube 5 are effected by simply moving the second element longitudinally. The head 10 and its housing in the end piece 9 are preferably provided, as illustrated in Fig. 2, with inclined bearing portions facilitating the relative centering of both these members upon assembly.

Both end pieces 8 and 9 (Fig. 3) carry flanges allowing their assemblage, for instance by means of bolts and nuts 11, in position for use.

The connection between the tube 5 and the suspended part 4 is ensured by engagement of the corresponding end of this tube in a fork-piece 6, which is secured, for instance, by bolts and nuts 14, to the longitudinal bearer of the chassis, and in which the end of the tube can rotate about the axis X—X, without moving longitudinally.

This end of the tube 5 is rendered rigid, for instance by a fluted joint, with a member 12 forming, above and below the axis X—X, two lugs 12a; these lugs cooperate with abutment-screws 13 secured in the fork-piece 6 so as to prevent the rotation of the member 12 (and, with it, of the tube 5) about the axis X—X, thus providing the resilient suspension according to the arrangement described.

By suitably screwing or unscrewing the screws 13, then by locking them by means of lock-nuts, it is possible to adjust with the greatest ease the tension of the resilient tube 5 and, consequently, the mean position under load of this suspension device.

The assemblage and removal of the tube 5 are also effected with the greatest ease: for removing the tube, it suffices to separate the fork-piece 6 from the chassis by unscrewing the nuts 14, then, after having unscrewed the nuts 11, to separate both end pieces 8 and 9.

Figs. 5 and 6 illustrate an improved modification, in which the fork-piece 6 is replaced by a member permanently secured on the chassis and so arranged as to allow the tube 5 to receive the longitudinal displacement necessary for disengaging it from the pivot pin 7, without having to remove this member replacing the fork-piece 6.

The said member is provided with a base 6a, secured on the longitudinal bearer of the chassis and rigid with a rod 6b, bent at right angles according to the axis X—X, towards the tube 5; the free end of this rod 6b, which forms a spherical member 6c, is fitted into the corresponding end of the tube 5, which end can longitudinally slide on the spherical member 6c. This spherical member 6c will preferably be situated in the same plane at right angles to the bar or tube as the abutment-screws 13", so that the bar or tube should not be subjected to parasitic bending stresses.

This end of the tube 5 is rigid with two radial arms 12', in the ends of which are screwed abutment-screws 13', which press upon bearing portions 16 of the longitudinal bearer of the chassis and fulfill the same function as the screws 13 of the preceding form of construction.

The removal of the tube 5 is effected in a remarkably simple manner: it suffices, after having unscrewed the nuts 2, to cause the tube 5 to slide, according to the direction of the arrow F, on the end of the rod 6b, until the end piece 9 is released from the head 10.

Fig. 7 illustrates a modification in which the general arrangement is similar, with this difference that, in the sliding assemblage of the tube 5 and of the member 6" secured to the longitudinal bearer of the chassis, the spigot 5a is rigid with the rod 5, whilst the recess is formed in the member 6". Two radial arms 12" are rigid with the tube 5, and, in the preceding form of construction, they carry adjusting abutment-screws 13". The spherical member 6c will again preferably be situated in the same plane at right angles to the bar or to the tube as the abutment-screws 13", so that the bar or the tube should not be subjected to parasitic bending stresses.

Instead of a single tube or rod resiliently working under a torsional stress, it is obviously possible to use any number of these elements.

Figure 8:
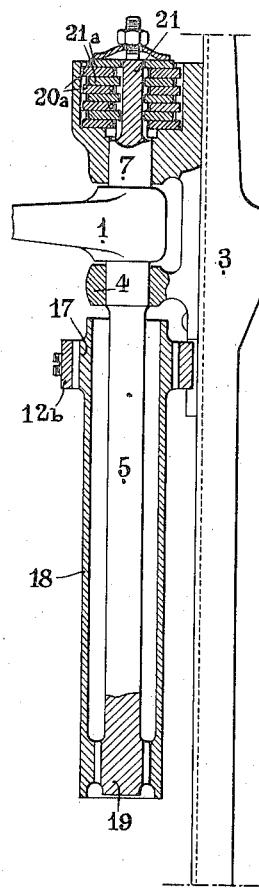

Fig. 8 illustrates an example in which, to the end 19 of the rod or tube opposed to that which is connected to the shaft 1, is secured a tube 18 which surrounds the member 5, and the free end 19 of which, adjacent to the fork-piece 4, carries a member 12b provided with abutment-screws or other equivalent adjusting means serving as a connection between this end 17 and the longitudinal bearer of the chassis.

This arrangement has the advantage of being more compact, for an equal amount of resiliency, than a single suspension tube or rod.

Moreover, both concentric tubes or rods 5 and 18 are left in an overhanging position, and the only connection between the arm 1, the longitudinal bearer of the chassis and the resilient device is constituted by the fork-piece 4, concurrently with the abutment-members allowing the adjustment. Both elements 5 and 18 of this device are arranged in series, and the total resilient distortion is equal to the sum of the respective distortions of both these elements.

Devices having any number of elements arranged in the manner indicated can obviously be provided if need be.

It is also possible to use, in combination with the device according to the invention, a shock absorber of any suitable type.

The form of construction shown in Fig. 8 comprises, for instance, a shock absorber of the solid friction type; an extension 21 of the pivot pin 7 carries friction discs 21a which cooperate with fixed discs 20a mounted on a support 20 rigid with the fork-piece 4.

Figure 9:
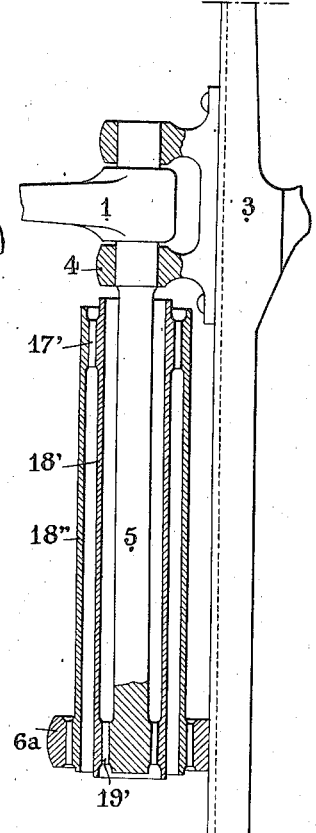

The form of construction illustrated in Fig. 9 comprises three elements 5, 18', 18", concentrically arranged; the elements 5 and 18' are assembled at 19', the elements 18' and 18" are assembled at 17', and the free end of the element 18" is connected to the longitudinal bearer of the chassis by a member 6d arranged in any suitable manner and eventually provided with means for adjusting the tension of this resilient device.

Figure 10:
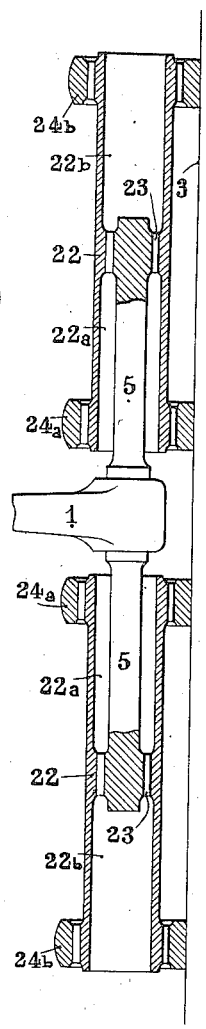

In the form of construction illustrated in Fig. 10, the end of the member 5 extends into a tube 22, in the middle portion of which it is secured at 23; both ends of this tube are connected, at 24a and 24b, to the longitudinal bearer of the chassis, so that, in this device, both elements 5 and 22 work in series, and the second is composed of two halves 22a and 22b, working in parallel.

This device is completed, in the example illustrated, by a device which is symmetrical relatively to the plane in which the arm 1 moves. In the drawings, the various elements of this device are designated by the same reference numbers as the corresponding elements of the device previously described, with the addition of the indicia '. These two parts of the suspension thus symmetrically operate in parallel.

Figure 11:
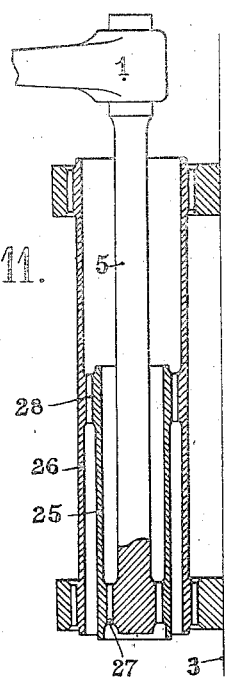

Finally, Fig. 11 illustrates a series-parallel combination of three resilient elements 5, 25 and 26, concentrically arranged. The end of the element 5 is secured, at 27, to one of those of the median element 25; the other end of this element 25 is secured, at 28, to the median portion of the outer element 26. As in the preceding case, this device, as well moreover as all the other devices previously described, can be completed by a second device symmetrically arranged relatively to the plane in which the arm 1 moves.

It is easy, from the indications which have been given, to devise an infinity of modifications of the forms of construction above described solely by way of example; in particular, it is possible to modify the mode of assemblage of the arm 1 and of the resilient device, as well as the means allowing to vary the initial tension of this device; the number and arrangement (series, parallel, series-parallel) of the various resilient elements of this suspension can also be modified.

I claim:—

1. In a suspension for motor cars or other vehicles, the combination of a rod capable of resiliently working under a torsional stress, two supports secured on the said vehicle and in which the ends of said rod are rotatively mounted, a lever rigid with one end of said rod and adapted to carry a wheel at its free end, abutments rigid with the other end of said rod, a pair of abutments secured to the chassis of the vehicle and arranged for cooperating with the abutments of said rods, and adjusting means for some of these abutments.

2. A suspension for vehicles as claimed in claim 1, in which the end of said rod opposed to said lever carries a sleeve secured on the same and carrying two abutments symmetrical relatively to its axis and each cooperating with an abutment-screw screwed in the corresponding support secured to the vehicle.

3. A suspension for vehicles as claimed in claim 1, in which the end of said rod opposed to said lever is rotatively fitted on to a spherical member secured to the vehicle and is rigid with a ring provided with symmetrical arms in the ends of which are screwed abutment-screws adapted to bear upon bearing portions provided on the chassis of the vehicle.

4. A suspension for vehicles as claimed in claim 1, in which the end of said rod opposed to said lever is rigid with a spherical member rotatively mounted on a support secured to the vehicle, said rod being also rigid with two symmetrical arms in the ends of which are screwed abutment-screws adapted to bear upon bearing portions provided on the chassis of the vehicle in the plane of said spherical member.

ANDRÉ RENÉ LEFEVRE.